(12) United States Patent
Nielsen

(10) Patent No.: US 10,379,212 B2
(45) Date of Patent: Aug. 13, 2019

(54) MULTI FREQUENCY RANGE ESTIMATION

(71) Applicant: Weibel Scientific A/S, Allerød (DK)

(72) Inventor: Jens Jørgen Nielsen, Hørsholm (DK)

(73) Assignee: Weibel Scientific A/S, Allerod (DK)

( * ) Notice: Subject to any disclaimer, the term of this patent is extended or adjusted under 35 U.S.C. 154(b) by 272 days.

(21) Appl. No.: 15/123,168

(22) PCT Filed: Mar. 4, 2015

(86) PCT No.: PCT/DK2015/050045
§ 371 (c)(1),
(2) Date: Sep. 1, 2016

(87) PCT Pub. No.: WO2015/131906
PCT Pub. Date: Sep. 11, 2015

(65) Prior Publication Data
US 2017/0074979 A1 Mar. 16, 2017

(30) Foreign Application Priority Data
Mar. 6, 2014 (DK) .................................. 2014 70108

(51) Int. Cl.
*G01S 13/38* (2006.01)
*G01S 15/08* (2006.01)
(Continued)

(52) U.S. Cl.
CPC ............. *G01S 13/38* (2013.01); *G01S 13/36* (2013.01); *G01S 15/08* (2013.01); *G01S 17/36* (2013.01)

(58) Field of Classification Search
CPC .......... G01S 13/38; G01S 15/08; G01S 17/36; G01S 13/36; G01S 13/951; G01S 19/08; G01S 3/8006; G01S 13/726; G01J 9/04
See application file for complete search history.

(56) References Cited

U.S. PATENT DOCUMENTS 4,537,502 A     8/1985   Miller et al.
4,557,386 A * 12/1985   Buckley ............... G01N 29/075
                                                                           209/527
(Continued)

FOREIGN PATENT DOCUMENTS

DE    102013207652 A1    11/2013
EP        2680032 A1     1/2014
(Continued)

OTHER PUBLICATIONS

International Search Report and Written Opinion, from PCT/DK2015/050045 with an international filing date of Mar. 1, 2015, dated May 20, 2015, 10 pgs., European Patent Office, Rijswijk, The Netherlands.
(Continued)

*Primary Examiner* — Bernarr E Gregory
(74) *Attorney, Agent, or Firm* — BakerHostetler

(57) ABSTRACT

Disclosed is a method for estimating the range to an object, the method comprising: transmitting a first signal towards the object; receiving a reflected echo signal reflected from the object; and determining a measured point (MP) in an N-dimensional phase space. The range to the object is estimated by selecting a candidate range estimate from a plurality of candidate range estimates, each candidate range estimate in the unambiguous range R having an unique associated point in the N-dimensional phase space positioned on range lines, and wherein a candidate range estimate is selected dependent on the distance from its unique associated point in the N-dimensional phase space to the measured point (MP), so that a single range estimate is generated using information from at least two measured phase differences without directly averaging ambiguous range estimates.

20 Claims, 7 Drawing Sheets

(51) Int. Cl.
*G01S 17/36* (2006.01)
*G01S 13/36* (2006.01)

(56) References Cited

U.S. PATENT DOCUMENTS

| | | | | |
|---|---|---|---|---|
| 4,780,605 | A * | 10/1988 | Tiemann | G01J 9/04 |
| | | | | 257/E27.16 |
| 5,537,119 | A * | 7/1996 | Poore, Jr. | G01S 13/726 |
| | | | | 342/96 |
| 5,696,700 | A * | 12/1997 | O'Brien, Jr. | G06K 9/00523 |
| | | | | 702/179 |
| 5,959,574 | A * | 9/1999 | Poore, Jr. | G01S 13/726 |
| | | | | 342/96 |
| 6,023,238 | A | 2/2000 | Cornic et al. | |
| 6,411,566 | B1 * | 6/2002 | Katz | G01S 3/8006 |
| | | | | 367/131 |
| 6,704,692 | B1 * | 3/2004 | Banerjee et al. | G01S 13/726 |
| | | | | 702/189 |
| 8,849,737 | B1 * | 9/2014 | Engler | G06N 5/02 |
| | | | | 706/13 |
| 8,963,766 | B2 * | 2/2015 | Furukawa | G01S 5/04 |
| | | | | 235/400 |
| 2007/0024487 | A1 | 2/2007 | Zemany et al. | |
| 2007/0222669 | A1 * | 9/2007 | Trautenberg | G01S 19/08 |
| | | | | 342/127 |
| 2008/0143571 | A1 * | 6/2008 | Sojka | G01S 13/951 |
| | | | | 341/144 |
| 2010/0103020 | A1 | 4/2010 | Wu | |
| 2010/0265489 | A1 | 10/2010 | Seeger | |
| 2011/0043407 | A1 | 2/2011 | Moshfeghi | |
| 2011/0193738 | A1 | 8/2011 | Cornic et al. | |
| 2013/0094560 | A1 | 4/2013 | Ezaki et al. | |
| 2013/0281038 | A1 | 10/2013 | Ezaki | |

FOREIGN PATENT DOCUMENTS

| | | |
|---|---|---|
| FR | 2969306 B1 | 12/2012 |
| JP | 2008-045940 A | 2/2008 |
| KR | 100910381 B1 | 8/2009 |
| WO | 2004053521 A1 | 6/2004 |
| WO | 2005104417 A2 | 3/2005 |

OTHER PUBLICATIONS

International Search Report and Written Opinion, from PCT/DK2015/050046 with an international filing date of Mar. 1, 2015, dated May 20, 2015, 10 pgs., European Patent Office, Rijswijk, The Netherlands.

* cited by examiner

| | Range line | $M_n = (m_1, m_2)$ | r·R | $\varphi_1$ | $\varphi_2$ | $d^2$ |
|---|---|---|---|---|---|---|
| 505 | 0 | $M_0 = (0, 0)$ | 0.079 | 0.238 | 0.397 | 0.035588 |
| 506 | 1 | $M_1 = (0, 1)$ | 0.226 | 0.679 | 0.132 | 0.106176 |
| 507 | 2 | $M_2 = (1, 1)$ | 0.315 | -0.056 | 0.574 | 0.282647 |
| 508 | 3 | $M_3 = (1, 2)$ | 0.462 | 0.385 | 0.309 | 0.000294 |
| 509 | 4 | $M_4 = (1, 3)$ | 0.609 | 0.826 | 0.044 | 0.247353 |
| 510 | 5 | $M_5 = (2, 3)$ | 0.697 | 0.091 | 0.485 | 0.129706 |
| 511 | 6 | $M_6 = (2, 4)$ | 0.844 | 0.532 | 0.221 | 0.023824 |

Columns labeled: 530, 531, 532, 533, 534

MULTI FREQUENCY RANGE ESTIMATION

CROSS-REFERENCE TO RELATED APPLICATIONS

This application is a national stage of international application no. PCT/DK2015/050045, filed Mar. 4, 2015, which claims priority to Denmark Patent Application No. 2014 70108, filed Mar. 6, 2014, the disclosures of which are incorporated herein by reference in their entirety.

FIELD

The present invention relates to methods and devices for estimating the range to an object. More specifically the invention relates to methods and devices for estimating the range to an object using multi frequency transmission of energy such as electromagnetic energy or acoustic energy.

BACKGROUND

Range estimation is used for a large number of application such as aerospace, defence, forensic science and automotive applications. The range may be estimated using transit time estimation of a transmitted signal, frequency comparison between a transmitted frequency modulated signal and the received echo, and multi frequency ranging.

Multi frequency ranging has the advantage that the range to an object can be determined with high accuracy without the need of complicated high precision timing equipment needed for transit time methods.

A Multi frequency ranging system transmits a signal comprising a primary frequency and a secondary frequency. The signal hits an object and the system receiver picks up the reflected signal. The relative phase, or the phase difference, between the primary frequency and the secondary frequency in the signal received by the system may be measured continuously. As the range increases the phase difference increases linearly modulo 360 degrees, with a slope proportional to the frequency difference between the primary frequency and the secondary frequency. This relation between the object range and the phase difference between two reflected signals is the basis for the multi frequency ranging technique.

In the case of a single secondary frequency the unambiguous range is limited to $\lambda 1 = c/2(f1-f0)$, where f0 is the primary frequency, f1 is the secondary frequency, and c is the speed of the signal in the medium in which it propagates in e.g. the speed of light for an RF signal. This means that range values offset by an integer number of $\lambda 1$ yields exactly the same phase difference.

WO2004053521 discloses a range detection apparatus comprising a transmitter adapted to transmit a microwave signal and a receiver adapted to receive an echo signal reflected from a target which corresponds to a portion of the transmitted signal; a signal generating means adapted to generate a drive signal to be applied to the transmitter to produce the transmitted signal, the signal generator producing a drive signal which includes a first signal frame comprising at least two frequencies and a second signal frame comprising at least two frequencies, the second signal frame differing from the first, and a processor adapted to process the echo signal together with the transmitted signal so as to determine the distance to the target that produced the echo signal.

Comparison means may be provided which is adapted to compare the distance determined from a pair of echo/transmit frequency samples within the first frame with the distance determined from samples taken for the corresponding pair of frequencies within the second transmitted frame. In the event that this comparison indicates that a difference exists between the determined distance from the first frame and for the second frame for at least one of the pairs the processor may produce an output indicating that the distance of the target from the apparatus is so great that the echo signal received within a frame in fact corresponds to a signal sent from a previous frame.

However, the apparatus is limited to detect objects within the lowest unambiguous range of the two frames.

The ambiguity is inversely proportional to the frequency difference, so by decreasing the distance between f1 and f0 the unambiguous range can be increased. However, range detection systems typically rely on filters protecting each receiver from being saturated by the adjacent carriers. Typically for radars, it is not feasible for f0 and f1 to be closer than approximately 800 kHz. Even if the filtering problem was solved, a small frequency difference yields a very noisy range measurement. Further, the difference between the frequencies has to be large enough to take an unknown Doppler frequency offset into account.

US20100103020 discloses a method of detecting a moving target within a predefined protected region with a microwave motion detector, by transmitting microwave frequency signals and receiving the microwave frequency signals reflected by a target. To determine the target distance without ambiguity, three or more microwave frequency signals may be transmitted at different frequencies.

In particular, the step of determining phase angles from the sampled intermediate frequency signal components comprises determining a first, second, and third phase from the sampled intermediate frequency signal components; the step of determining a phase difference between the phase comprises determining a first phase difference between the second phase and the first phase, and determining a second phase difference between the third phase and the first phase; and the step of determining, from the phase difference, a corresponding target distance measurement comprises: for each of the first and second phase differences, determining two corresponding distance measurements, wherein one distance measurement is a true distance measurement and the other distance measurement is an ambiguous distance measurement, and selecting an accurate distance measurement by matching the common true distance measurement of each phase difference.

Consequently, the unambiguous range can be increased.

However, in the presence of noise there exists the risk that an ambiguous range is selected as the true range. Even if the method successfully filters the ambiguous distances out, the signal to noise ratio for the distance measurement may be poor. This is especially problematic if the measurements are performed over large distances of up to several kilometers.

Thus it remains a problem to provide a precise range estimation method and/or device having a high unambiguous range.

SUMMARY

According to a first aspect, the invention relates to a method for estimating the range to an object using transmission of a multi frequency signal comprising the steps of:
transmitting a first signal towards the object, wherein the first signal comprises at least a primary frequency (F0), a first frequency (F1), and a second frequency (F2);

receiving a reflected echo signal reflected from the object comprising at least the primary frequency (F0'), the first frequency (F1'), and the second frequency (F2');

determining a measured point (MP) in an N-dimensional phase space comprising at least a first phase coordinate representing the phase difference between the phase of the first frequency (F1') and the phase of the primary frequency (F0') in the received reflected echo signal, and a second phase coordinate representing the phase difference between the phase of the second frequency (F2') in the received reflected echo signal and the phase of a first reference frequency in a first reference signal wherein the first reference signal is a reflected echo signal reflected from the object;

wherein the range to the object is estimated by selecting a candidate range estimate from a plurality of candidate range estimates, each candidate range estimate in the unambiguous range R having an unique associated point in the N-dimensional phase space positioned on range lines, and wherein a candidate range estimate is selected dependent on the distance from its unique associated point in the N-dimensional phase space to the measured point (MP), so that a single range estimate is generated using information from at least two measured phase differences without directly averaging ambiguous range estimates.

Consequently, the risk of selecting an ambiguous range is decreased as all available information in the at least two measured phase differences is used to filter out ambiguous range estimates.

Additionally, the signal to noise ratio of the estimate is improved as an estimate is generated using information from at least two measured phase differences without first generating an intermediate range estimate.

The first signal may be an electromagnetic signal comprising frequencies in one, or more of the following ranges: the X-ray range, the ultraviolet range, the visible range, the infrared range, the microwave range or the radio range. Alternatively, the first signal may be an a acoustic signal and may comprise frequencies in the ultrasound range (>20 KHz) and or below.

In some embodiments, the first signal is an electromagnetic signal comprising frequencies within the microwave range and/or the radio range.

In some embodiments, the first signal is a continuous wave signal.

The first signal may have a duration of at least 50, 100, 500 or 1000 micro seconds.

If the object is moving relative to the transmitter/receiver the frequencies in the received signal will be doppler shifted. Thus, the primary frequency (F0'), the first frequency (F1') and the second frequency (F2') in the received reflected echo signal may be Doppler shifted relative to the primary frequency (F0), the first frequency (F1) and the second frequency (F2) in the transmitted first signal.

In some embodiments, the speed of the object is additionally estimated by estimating a Doppler frequency shift in the received reflected echo signal.

In some embodiments, frequencies of the received reflected echo signal are compensated for the estimated Doppler shifts.

The primary frequency (F0), the first frequency (F1), and the second frequency (F2) may be transmitted simultaneously e.g. the first signal may comprise the primary frequency (F0), the first frequency (F1), and the second frequency (F2) in a first part. The first signal may alternatively comprise different frequencies in different parts e.g. the primary frequency (F0) and the first frequency (F1) may be transmitted in a first part of the first signal and the primary frequency (F0) and the second frequency (F2) may be transmitted in a second part of the first signal.

In some embodiments, the first reference signal is the received reflected echo signal, and the first reference frequency in the first reference signal is the primary frequency (F0').

The first phase coordinate of the measure point (MP) in phase space may be estimated by simultaneously transmitting the primary frequency (F0) and the first frequency (F1), receiving a reflected echo signal comprising the primary frequency (F0') and the first frequency (F1'), determining the phase of the primary frequency (F0') and the first frequency (F1') in the reflected echo signal e.g. by calculating the FFT of the received reflected echo signal, and subtracting the determined phases to find the difference between them. The received signal may be mixed down in frequency before the phases are determined e.g. the received signal may be mixed down by the transmitted signal prior to the FFT.

Any phase coordinate of the measure point (MP) may be estimated using the same techniques as described in relation to the estimation of the first phase coordinate.

The N-dimensional phase space has a dimension equal to the number of phase coordinates in the measure point (MP), thus it is at least a 2 dimensional space. The first signal may comprise more than three frequencies e.g. the first signal may comprise at least 4, 5, 6, 8 or 10 frequencies. By increasing the number of frequencies in the first signal more phase coordinates may be determined. Thus the measured point (MP) in phase space may comprise more than two phase coordinates e.g. the measured point (MP) may comprise at least 3, 4, 5, 6, 8 or 10 phase coordinates. This increases the precision of the range estimate.

Range lines represent the theoretical possible combination of phase coordinates corresponding to a specific range. All range lines are parallel in phase space.

The n'th normalized phase coordinate $\varphi_n(r)$ of a unique associated point for a candidate range r can be determined using the equation below:

$$\varphi_n(r) = \frac{r \bmod \lambda_n}{\lambda_n} \quad (1)$$

where mod is the modulo operator with a positive remainder, and $\lambda_n$ is the unambiguous range for the phase difference of the n'th phase coordinate given by the equation below:

$$\lambda_n = c/2 \cdot (f_1 - f_0) \quad (2)$$

where c is the speed of the first signal in the medium in which it propagates, and $f_1$ and $f_0$ are the two frequencies which phases are used to generate the n'th phase coordinate of the measure point (MP).

In some embodiments, the first signal further comprises a third frequency (F3), and the measured point in the N-dimensional phase space further comprises a third phase coordinate representing the phase difference between the phase of the third frequency (F3) in the received reflected echo signal and the phase of a second reference frequency in a second reference signal so that a single range estimate is generated using information from at least three measured phase differences without first directly averaging ambiguous range estimates.

Consequently, the precision of the method may be increased.

In some embodiments, the second reference signal is the received reflected echo signal, and the second reference frequency is the primary frequency (F0').

In some embodiments, the selected candidate range estimate is the candidate range estimate having an associated point in the N-dimensional phase space with the lowest distance to the measured point (MP).

Consequently, by using the criteria of distance in the N-dimensional phase space an effective way of utilizing all information in the measured phase differences for estimating the range is provided.

In some embodiments, a candidate range estimate is selected by selecting a first set of the candidate range estimates, and for each candidate range estimate in the first set of candidate range estimates determining the distance from its unique associated point in the N-dimensional phase space to the measure point (MP); wherein the range to the object is estimated by selecting the candidate range estimate of the first set of candidate range estimates having an unique associated point in the N-dimensional phase space with the smallest distance to the measured point (MP).

The squared distance $d^2$ from a unique associated point of a candidate range estimate r to the measured point (MP) may be determined using the equation below:

$$d^2(r) = \sum_{i=1}^{N} (\varphi_i - \varphi a_i(r))^2 \quad (3)$$

wherein N is the dimension of the phase space e.g. the number of phase coordinates, $\varphi_i$ is the i'th phase coordinate of the measured point (MP), and $\varphi a_i(r)$ is the i'th phase coordinate of the unique associated point in phase space of the candidate range estimate r.

By limiting the search of candidate range estimates to a finite set of estimates and determining the distance from their associated points to the measured point (MP) an efficient way of estimating the range to an object is provided.

In some embodiments, the unique associated points in the N-dimensional phase space of the candidate range estimates in the first set of candidate range estimates are positioned in a first N−1 dimensional hyper plane, wherein the first N−1 dimensional hyper plane is positioned so that the measured point (MP) in the N-dimensional phase space is positioned in the first N−1 dimensional hyper plane, and wherein the first N−1 dimensional hyper plane is oriented so that it is perpendicular to the range lines.

As all range lines are parallel in the N-dimensional phase space, and the shortest path from a point to a line is perpendicular to the line, the search for the candidate range estimate having the unique associated point being closest to the measure point (MP) in phase space can be limited to candidate range estimate having associated points positioned in the N−1 dimensional hyper plane positioned and oriented as specified above.

Consequently, an indefinite number of candidate ranges can be limited to a finite number equaling the number of range lines.

In some embodiments, the first set of candidate range estimates is selected by examining a plurality of range lines, and for each of the plurality of range lines determining the candidate range having an associated point on the range line that have the lowest distance to the measured point (MP) in the N-dimensional phase space.

In some embodiments, the first set of candidate range estimates is selected from a plurality of sets of candidate range estimates dependent on the position of the measure point (MP) in N-dimensional phase space.

Consequently, a smaller number of candidate range estimates needs to be examined.

A look-up table may be used to select the first set of candidate range. The look-up table may directly specify the candidate ranges. Alternatively the look-up table may specify range lines comprising candidate ranges and the candidate ranges may subsequently be determined by examining the specified range lines.

If the measured point (MP) is close to the boundary of the N-dimensional phase space it cannot with certainty be known from which side of the boundary the point originates.

In some embodiments, the method further comprises the steps of:
generating an alternative measured point (AMP) in the N-dimensional phase space if at least one of the phase coordinates of the measured point (MP) in the N-dimensional phase space is within a predetermined range;
determining for each candidate range estimate in the first set of candidate range estimates the distance from its associated point in N-dimensional phase space to the alternative measured point (AMP);
wherein the range to the object is estimated by selecting the candidate range estimate having the lowest minimum distance, wherein the minimum distance for a candidate range estimate is defined as the distance from its associated point in N-dimensional phase space to the measured point (MP) in N-dimensional phase space or the alternative measure point (AMP) in N-dimensional phase space whichever is lower.

The predetermined range may be within a predetermined distance from a boundary of the N-dimensional phase space. The alternative measured point (AMP) may correspond to the measured point (MP) for all phase coordinates except for the one or more phase coordinate(s) being within the predetermined range. Those phase coordinates of the alternative measured point (AMP) may be found by subtracting the original phase coordinate from 1 (assuming the phases are normalized).

Consequently, risk of selecting a wrong candidate range is lowered.

According to a second aspect the invention relates to a device for estimating the range to an object using transmission of a multi frequency signal; wherein the device comprises:
a transmitter configured to transmit a first signal towards the object, wherein the first signal comprises at least a primary frequency (F0), a first frequency (F1), and a second frequency (F2);
a receiver configured to receive a reflected echo signal reflected from the object comprising at least the primary frequency (F0'), the first frequency (F1'), and the second frequency (F2'); and
a processing unit configured to determining a measured point (MP) in an N-dimensional phase space comprising at least a first phase coordinate representing the phase difference between the phase of the first frequency (F1') and the phase of the primary frequency (F0') in the received reflected echo signal, and a second phase coordinate representing the phase difference between the phase of the second frequency (F2') in the received reflected echo signal and the phase of a first reference frequency in a first reference signal wherein the first reference signal is a reflected echo signal reflected from the object;

wherein the processing unit further is configured to estimate the range to the object by selecting a candidate range estimate from a plurality of candidate range estimates, each candidate range estimate in the unambiguous range R having an unique associated point in the N-dimensional phase space positioned on range lines, and wherein a candidate range estimate is selected dependent on the distance from its unique associated point in the N-dimensional phase space to the measured point (MP), so that a single range estimate is generated using information from at least two measured phase differences without directly averaging ambiguous range estimates.

The first signal may be an electromagnetic signal comprising frequencies in one, or more of the following ranges: the X-ray range, the ultraviolet range, the visible range, the infrared range, the microwave range or the radio range e.g. the transmitter and the receiver may be an optical transmitter/receiver, a RF transmitter/receiver etc.

Alternatively, the first signal may be an acoustic signal and may comprise frequencies in the ultrasound range (>20 KHz) and or below e.g. the transmitter and the receiver may be a transducer.

In some embodiments, the first signal is a continuous wave signal e.g. the transmitter is a continuous wave transmitter.

The first signal may have duration of at least 50, 100, 500 or 1000 micro seconds.

In some embodiments, processing unit is further configured to estimate the speed of the object by estimating a Doppler frequency shift in the received reflected echo signal.

In some embodiments, the second reference signal is the received reflected echo signal, and the reference frequency in the second reference signal is the primary frequency (F0').

In some embodiments, the first signal further comprises a third frequency (F3), and wherein the measured point in the N-dimensional phase space further comprises a third phase coordinate representing the phase difference between the phase of the third frequency (F3) in the received reflected echo signal and the phase of a second reference frequency of a second reference signal so that a single range estimate is generated using information from at least three measured phase differences without first generating intermediate range estimates.

In some embodiments, the second reference signal is the received reflected echo signal, and the reference frequency in the third reference signal is the primary frequency (F0').

In some embodiments, the processing unit is configured to select the candidate range estimate having an associated point in the N-dimensional phase space with the lowest distance to the measured point (MP).

In some embodiments, the processing unit is configured to select a candidate range estimate by selecting a first set of the candidate range estimates, and for each candidate range estimate in the first set of candidate range estimates determining the distance from its unique associated point in the N-dimensional phase space to the measure point (MP); and estimate the range to the object by selecting the candidate range estimate of the first set of candidate range estimates having an unique associated point in the N-dimensional phase space with the smallest distance to the measured point (MP).

In some embodiments, the unique associated points in the N-dimensional phase space of the candidate range estimates in the first set of candidate range estimates are positioned in a first N−1 dimensional hyper plane in the N-dimensional phase space, wherein the first N−1 dimensional hyper plane is positioned so that the measured point (MP) is positioned in the first N−1 dimensional hyper plane, and wherein the first N−1 dimensional hyper plane is oriented so that it is perpendicular to the range lines.

In some embodiments, the processing unit is configured to select the first set of candidate range estimates by examining a plurality of range lines, and for each of the plurality of range lines determining the candidate range having an associated point on the range line that have the lowest distance to the measured point (MP) in the N-dimensional phase space.

In some embodiments, the processing unit is configured to select the first set of candidate range estimates from a plurality of sets of candidate range estimates dependent on the position of the measure point (MP) in the N-dimensional phase space.

In some embodiments, the processing unit further is configured to:
  generate an alternative measured point (AMP) in the N-dimensional phase space if at least one of the phase coordinates of the measured point (MP) in the N-dimensional phase space is within a predetermined range; and
  determining for each candidate range estimate in the first set of candidate range estimates the distance from its associated point in the N-dimensional phase space to the alternative measured point (AMP);
wherein the range to the object is estimated by selecting the candidate range estimate having the lowest minimum distance, wherein the minimum distance for a candidate range estimate is defined as the distances from its associated point in the N-dimensional phase space to the measured point (MP) or the alternative measure point (AMP) whichever is the lowest.

Here and in the following, the term 'processing unit' is intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof.

The different aspects of the present invention can be implemented in different ways including the methods for estimating the range to an object, and the device for estimating the range to an object described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependant claims.

Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1A:
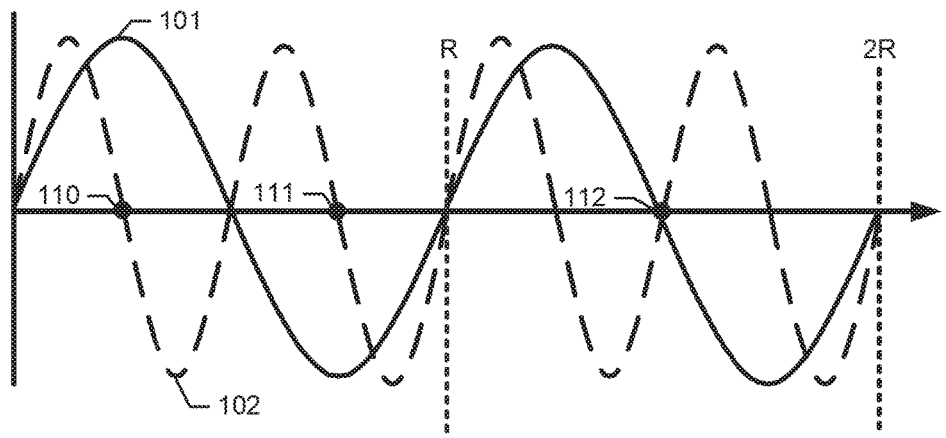
FIG. 1a-b illustrate the principle of multi frequency range estimation using two frequencies.
Figure 1B:
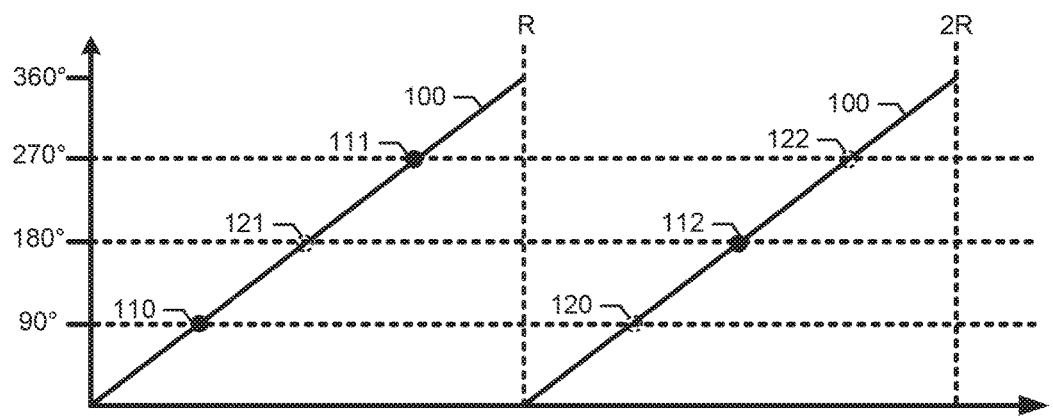

FIG. 1a-b illustrates the principle used in a multi frequency ranging system. FIG. 1a shows two frequencies 101 102 of a transmitted signal. The first frequency 101 has a frequency f1 and the second frequency component 102 has a frequency 2*f1. The two frequencies 101 102 of the transmitted signal have been shown as two separate signals for making the principle more understandable. FIG. 1b shows the phase difference as a function of distance between the frequencies 101 102 of the signal. When the range increases the phase difference between the first and the second frequencies 101 102 increases linearly modulo 360 degrees, with a slope proportional to the frequency difference between the two frequency components i.e. f1. Thus when the transmitted signal is reflected by an object, the distance to that object can be found by looking at the phase difference between the two frequency components in the reflected signal.

As mentioned above, in the case of a single secondary frequency the unambiguous range is limited to R=0.5 c/(f2−f1), where c is the speed of the transmitted signal in the medium in which it propagates in e.g. the speed of light for an RF signal. This means that range values offset by an integer number of R yields exactly the same phase difference.

Shown in FIG. 1a is a first object 110 positioned with a distance of R/4, a second object 111 positioned with a distance of 3R/4, and a third object 112 positioned with a distance of 3R/2. From FIG. 1b it can be seen that a signal reflected by the first object 110 has a phase difference between the first and the second frequencies of 90 degrees and a signal reflected by the second object 111 has a phase difference between the first and the second frequencies of 270 degrees. Thus by looking at the phase difference between the first and second frequencies 101 102 of the received reflected signal the distance to the first and second object can be estimated.

However, a signal reflected by the third object 112 has a phase difference of 180 degrees apparently looking as if the third object 112 was positioned with a distance of R/2. Thus erroneous estimates results if objects are positioned outside the unambiguous range.

To get both a high unambiguous range, R, a good separation between the primary and the secondary frequency and an accurate range estimate, multiple frequencies can be used. This is achieved by transmitting a signal comprising at least three frequencies, where the frequencies are selected so that every distance within the range R has a unique associated point in phase space.

Figure 2A:
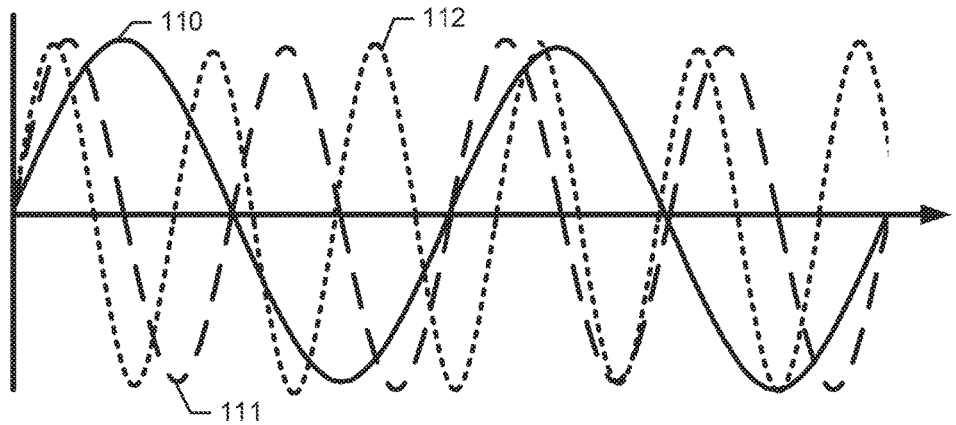
FIG. 2a-c illustrate the principle of multi frequency range estimation using more than two frequencies.
Figure 2B:
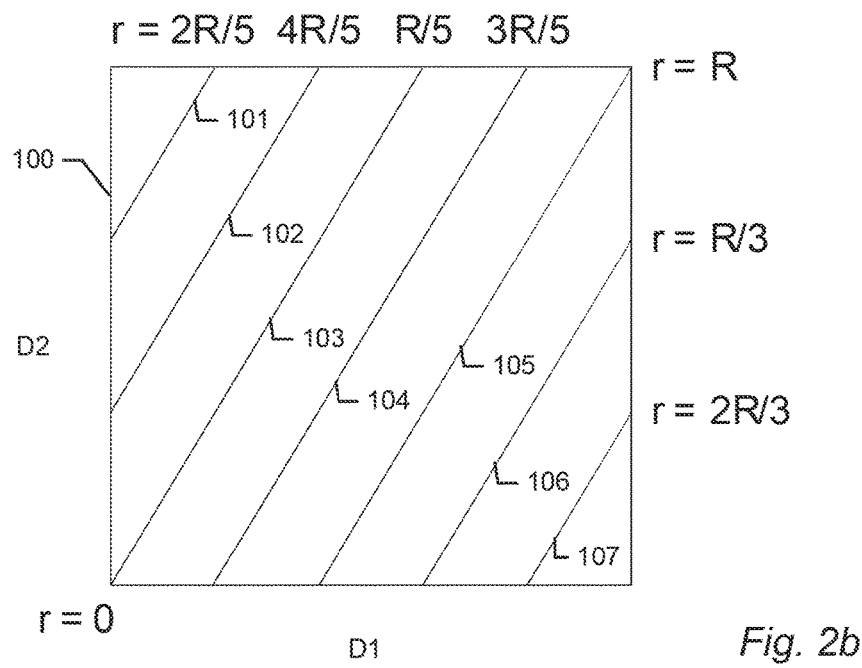
Figure 2C:
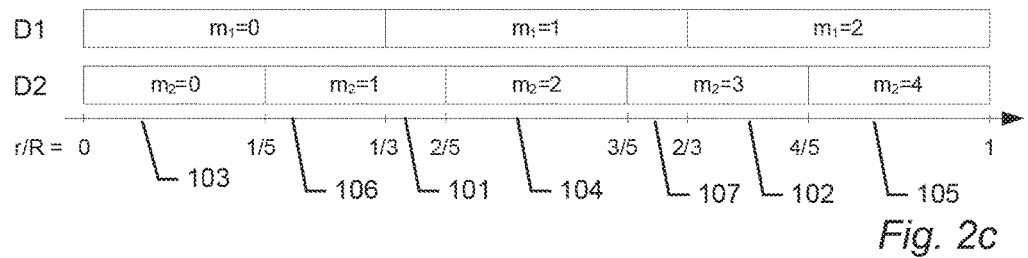

FIGS. 2a-c show an example where a signal is transmitted comprising three frequencies according to an embodiment of the present invention. FIG. 2a shows a transmitted signal comprising a primary frequency 110, a first frequency 111, and a second frequency 112. The primary frequency 110 has a frequency f1, the first frequency 111 has a frequency 2*f1, and the third frequency has a frequency 8/3*f1. The three frequency components 110 111 112 of the transmitted signal have been shown as three separate signals for making the principle more understandable.

FIG. 2b shows the resulting phase space when a first phase coordinate represents the (first) phase difference D1 between the primary frequency 110 and the first frequency 111, and a second phase coordinate represents the (second) phase difference D2 between the primary frequency 110 and the second frequency 112 in a reflected signal. In this example the frequency differences between the two frequencies 110 111 used to determined the first phase coordinate is f1, and the frequency difference between the two frequencies 110 112 used to determine the second phase coordinate is 5*f1/3. Thus the ratio between the two frequency differences is 3 to 5 (3,5). This makes the unambiguous range R=3*λ1=5*λ2, where λ1 and λ2 is the individual unambiguous range for each of the phase coordinates.

Thus the first phase difference D1, comprises three range cells, and the second phase difference D2 comprises 5 range cells within the unambiguous range, as shown in FIG. 2c. The range cells represent the unambiguous range for the individual phase differences.

By choosing the frequency difference ratio between different phase differences carefully the unambiguous range can be extended to any distance without having to transmit and receive frequencies being very close.

This principle may be generalized to cases where more frequencies are transmitted e.g. if 3 phase coordinates are determined and the frequencies differences have ratio of 3 to 4 to 5 (3, 4, 5) the unambiguous range becomes 3*λ1=4*λ2=5*λ3.

All unique associated points of the candidate ranges are positioned on the range lines 101-107. From FIG. 2c it can be seen that the range line 103 comprises associated points of candidate ranges within the interval from [0; R/5], the range line 106 comprises associated points of candidate ranges within the interval from [R/5; R/3], the range line 101 comprises associated points of candidate ranges within the interval from [R/3; 2R/5], the range line 104 comprises associated points of candidate ranges within the interval from [2R/5; 3R/5], the range line 107 comprises associated points of candidate ranges within the interval from [3R/5; 2R/3], the range line 102 comprises associated points of candidate ranges within the interval from [2R/3; 4R/5], and the range line 105 comprises associated points of candidate ranges within the interval from [4R/5; R].

Figure 3:
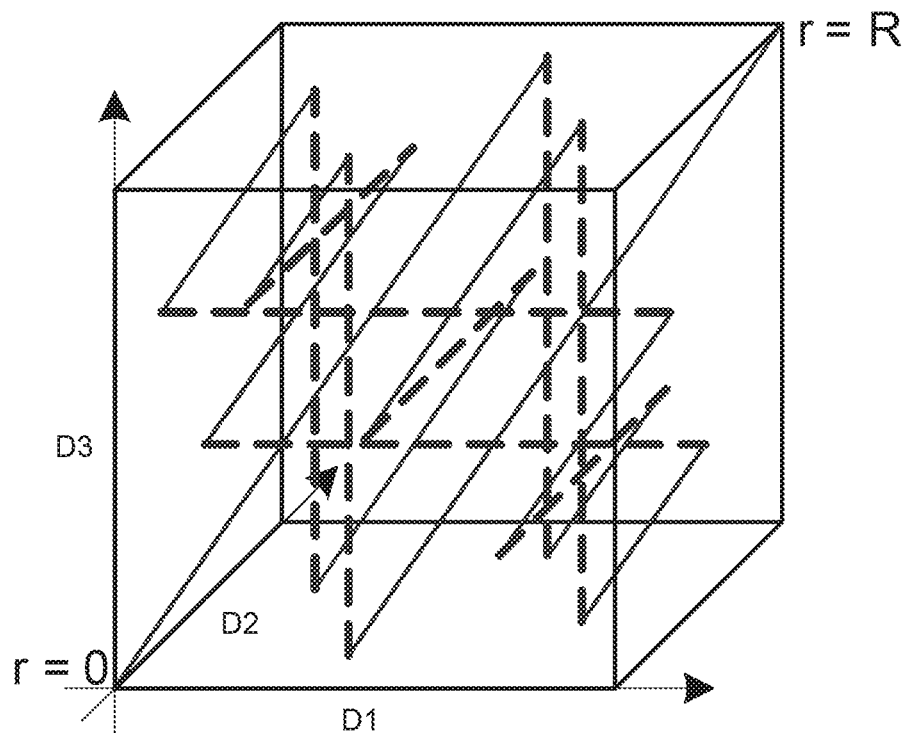
FIG. 3 shows a 3 dimensional phase space according to an embodiment of the present invention.

FIG. 3 shows an example of a three dimensional phase space comprising parallel range lines. In this example 3 phase differences D1, D2 and D3 are used and their frequency differences have a ratio of (3, 4, 5).

The dotted lines indicate transitions from a phase value of 1 to 0. E.g. follow the line segment from (0, 0, 0) to the top of the cube, where the dotted line takes you to the bottom of the cube. Here the second line segment starts and so on. The number of range lines is 10.

Figure 4:
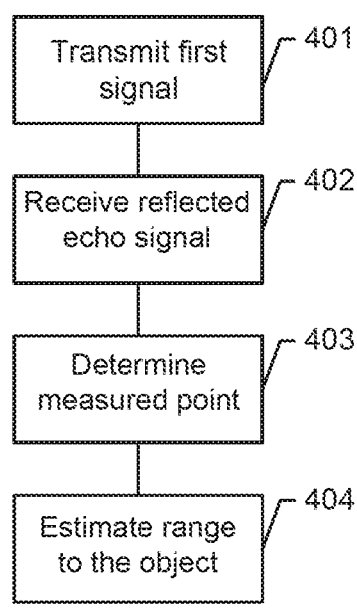
FIG. 4 shows a flowchart of a method for estimating the range to an object according to an embodiment of the present invention.

FIG. 4 shows flowchart of a method for estimating the range to an object using a transmission of a multi frequency signal according to an embodiment of the present invention. In step 401 a first signal is transmitted towards the object, wherein the first signal comprises at least a primary frequency (F0), a first frequency (F1), and a second frequency (F2). Next in step 402, a reflected echo signal reflected from the object is received, wherein the echo signal comprises at least the primary frequency (F0'), the first frequency (F1'), and the second frequency (F2'). Then in step 403, a measured point (MP) in an N-dimensional phase space comprising at least a first phase coordinate representing the phase difference between the phase of the first frequency (F1') and the phase of the primary frequency (F0') in the received reflected echo signal, and a second phase coordinate representing the phase difference between the phase of the second frequency (F2') in the received reflected echo signal and the phase of a first reference frequency in a first reference signal wherein the first reference signal is a reflected echo signals reflected from the object. Finally in step 404, the range to the object is estimated by selecting a candidate range estimate from a plurality of candidate range estimates, each candidate range estimate in the unambiguous range R having an unique associated point in the N-dimensional phase space positioned on range lines, and wherein a candidate range estimate is selected dependent on the distance from its unique associated point in the N-dimensional phase space to the measured point (MP), so that a single range estimate is generated using information from at least two measured phase differences without directly averaging intermediate range estimates.

Figure 5A:
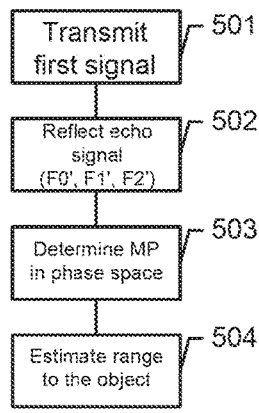
FIG. 5a-c shows an example of how the range to an object can be estimated using a method according to an embodiment of the present invention.
Figure 5B:
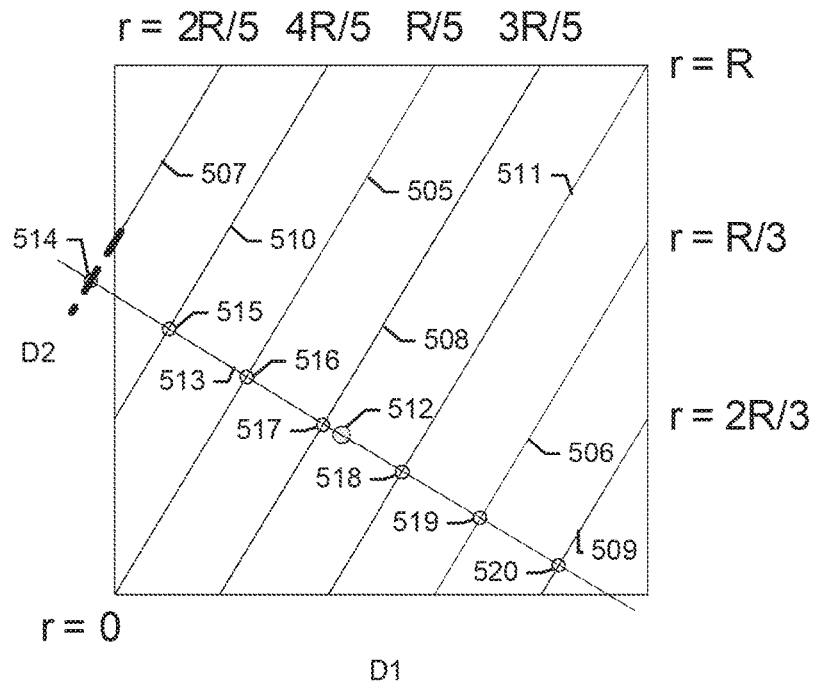
Figure 5C:
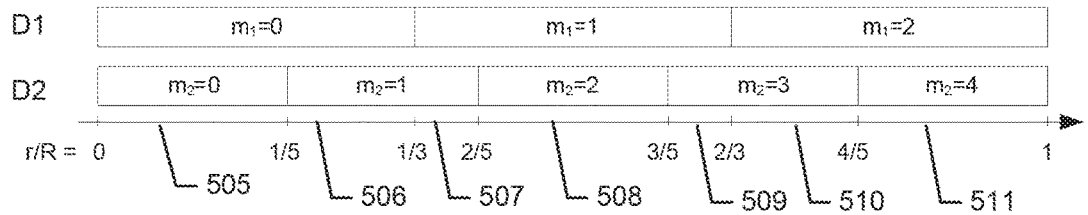

FIG. 5a-c shows an example of how the range to an object can be estimated using a method according to an embodiment of the present invention. FIG. 5a shows a flowchart of the method, FIG. 5b shows the resulting phase space, and FIG. 5c shows the resulting range cells. In step 501 of the method a first signal is transmitted towards the object, wherein the first signal comprises a primary frequency (F0), a first frequency (F1), and a second frequency (F2). Next, in step 502 a reflected echo signal reflected from the object is received wherein the reflected echo signal comprises the primary frequency (F0'), the first frequency (F1'), and the second frequency (F2'). Then in step 503 a measured point (MP) 512 in phase space is determined having a first phase coordinate $\varphi 1$ representing the phase difference between the phase of the first frequency (F1') and the phase of the primary frequency (F0'), and a second phase coordinate $\varphi 2$ representing the phase difference between the phase of the second frequency (F2') and the phase of the primary frequency (F0') in the received reflected echo signal. In this example the frequency differences (F1-F0) and (F2-F0) have a ratio of 3 to 5, thus the resulting phase space shown in FIG. 5b corresponds to the phase space shown in FIG. 2a. As mentioned in relation to FIG. 2, this makes the unambiguous range R=3*$\lambda 1$=5*$\lambda 2$, where $\lambda 1$ and $\lambda 2$ is the individual unambiguous range for each of the phase coordinates.

Thus the first phase coordinate difference D1, comprises three range cells, and the second phase difference D2 comprises 5 range cells within the unambiguous range, as shown in FIG. 5c.

The first phase coordinate $\varphi 1$ is determined to be 144 degrees, and the second phase coordinate $\varphi 2$ is determined to be 108 degrees. It can be seen in FIG. 5b that the measure point (MP) 512 is not positioned on one of the range lines 505-511 but slightly off. This is a result of different source of errors e.g. imprecision's in the transmitter/receiver. Practically a measure point (MP) will very rarely be positioned precisely on a range line. Finally in step 504, the method estimates the range to the object by selecting a candidate range estimate from a plurality of candidate range estimates each candidate range estimate in the unambiguous range R having a unique associated point in the 2-dimensional phase space positioned on the range lines, wherein a candidate range estimate is selected dependent on the distance from its unique associated point in the N-dimensional phase space to the measured point (MP).

The most probable candidate range estimate is the candidate range estimate having the associated point in phase space being closest to the measure point (MP). Thus in step 504 the method may estimate the range to the object by finding this. This may be done by selecting a first set of candidate ranges wherein the first set of candidate ranges comprises a plurality of candidate ranges equally spaced over the unambiguous range R, for each candidate range finding its associated point in phase space (using equation (1), see above), determining the distance from its associated point in phase space to the measure point (MP) (using equation 3, see above), and selecting the candidate range having an associated point in phase space being closest to the measured point (MP). The step of selecting the candidate range having an associated point in phase space may further comprise an interpolation to increase the precision e.g. a polynomial may be fitted to the K closest points e.g. the 3 closest points.

To improve performance, knowledge of the arrangement of the range lines in phase space may be used when the candidate ranges in the first set of candidate ranges is selected.

It is known that the shortest distance from a point to a first line in an N-dimensional space is through a second line going through the point and being perpendicular to the first line. Thus, for each range line, the point on the range line being closest to the measured point (MP) may be found by finding the intersection between the range line and a second line being perpendicular to the range line and going through the measured point (MP). This corresponds to finding the intersection between a first N−1 dimensional hyper plane and the range line, where the first N−1 dimensional hyper plane is positioned so that the measured point (MP) is positioned in the first N−1 dimensional hyper plane, and wherein the first N−1 dimensional hyper plane is oriented so that it is perpendicular to the range line. Further, as all range lines are parallel, the point on each range line being closest to the measure point (MP) is positioned in the same N−1 dimensional hyper plane.

Thus, the candidate range having the associated point being closest to the measure point (MP) may be found by selecting a first set of candidate ranges, one for each range line, wherein the associated points of each candidate range in the first set are positioned in a first N−1 dimensional hyper plane positioned and oriented as specified above.

In the present example, where the phase space is a 2 dimensional space, the n−1 dimensional hyper plane 513 is a line, as shown in FIG. 5b. The points 514-520 are intersection points between the n−1 dimensional hyper plane 513 and the range lines 505-511.

These intersection points may be found using the methods explained in relation of FIGS. 6 and 7 below. The methods are general methods that may be used with any dimension phase space.

Each phase coordinate of a range line corresponds to a unique range cell (for the specific phase difference), thus each range line corresponds to a unique combination of range cells. To determine the intersection points between the range lines and the first N−1 dimensional hyper plane, it may be useful to know the unique combination of range cells for each range line. This is done in the method explained in relation to FIG. 6.

The method determines a plurality of M vectors, one for each range line, where an M vector specify the combination of range cells unique for the particular range line, thus the M vector (1,3) for a particular range line specify that the associated points of the candidate ranges for the particular range line has first phase coordinates positioned in the second range cell (of the first phase difference) and has second phase coordinates positioned in the fourth range cell (of the second phase difference). Thus the M vector for the first range line will only comprise zeros, since the first range line pr. definition will have all phase coordinates positioned in first range cells.

The method starts with setting the counter n to 1. Next, in step 602 the M vector for the first range line, $M_0$, is initiated. As explained above, the first M vector is always a zero vector. The size of the M vectors corresponds to the number of phase coordinates i.e. the dimension of the phase space. Next a vector A is initiated. A is initiated to:

$$A=(1/v_1, 1/v_2, \ldots, 1/v_N)$$

where $v_n$ specify the number of range cells for the n'th phase difference in the chosen measurement setup, given by the frequency difference ratio between the frequency differences of the phase coordinates, and N is the total number of phase differences used. In the example shown in FIG. 5a-c, the frequency difference ratio between the first phase difference and the second phase difference is 3 to 5 thus v1=3, v2=5 and N=2, making A=(1/3, 1/5).

Next, a copy of the original version of the A vector is stored in the vector A_org, in step 604. Then, in step 606 the counter k is set to be zero and the variable min is set to be infinite. Then in step 607 it is examined whether the k'th value of the A vector is smaller than the value min. If the k'th value of the A vector is smaller than the value min, the method continues to step 608 and sets min to be equal the k'th value of the A vector, saves the value of k as the variable b, and continues to step 609. If the k'th value of the A vector is not smaller than the value min, the method skips step 608 and goes directly to step 609. In step 609 the method determines whether k is equal to N−1, where N is the number of phase coordinates used e.g. the method checks whether all values of the A vector has been examined. If k is not equal to N−1, the method returns to step 607 and increment the counter k by one. If k is equal to N−1 the method continues to step 610 where it determines whether min is equal to 1. If min is equal to 1 it means that an M vector has been created for all range lines, and the method terminates 614. If min is not equal to 1, it means that not all M vectors have been created and the method continues to step 611, where the M vector for the n'th range lines is initiated by setting it to be equal to the M vector for N−1'th range line. Next, in step 612 the b'th value of the M vector for the n'th range lines is increased by one, and the b'th value of the A vector is set to be increased by the b'th value of the vector A_org. Finally, the method returns to step 606 and increases n by one, to create the M vector for the next range line.

The method only needs to know the number of phase differences used, and the frequency difference ratio between the phase differences (to generate the A vector), these information are directly derivable from the chosen measurement setup. The method does not need to know the number of range lines before it is started.

Figures 7, 8:
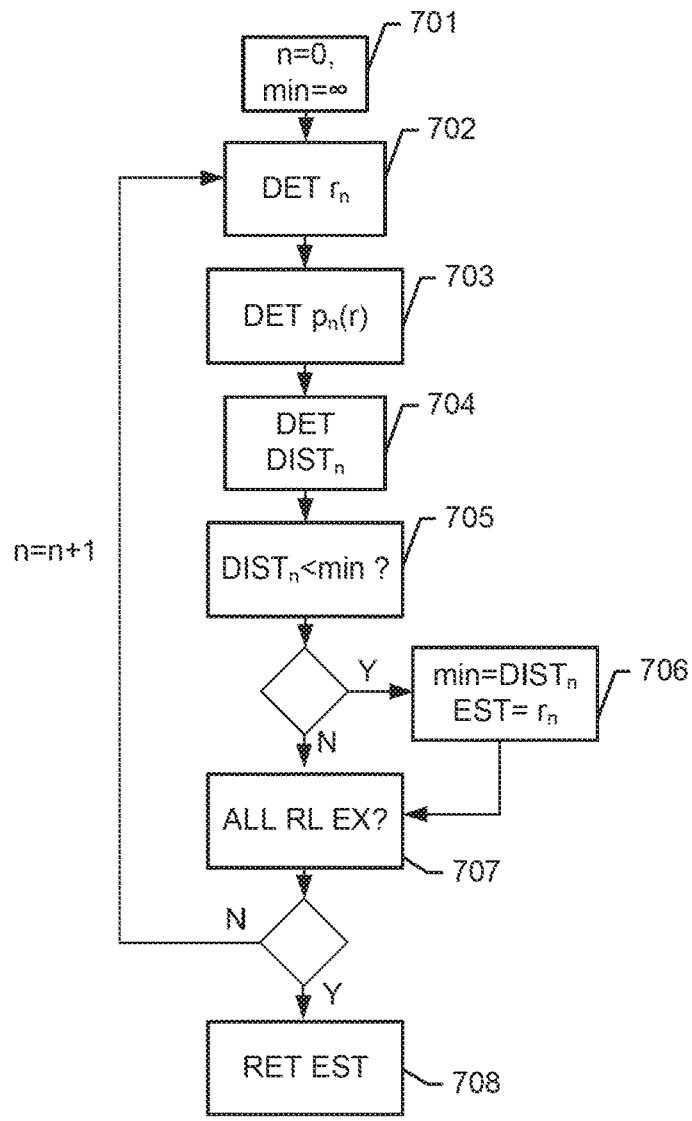
FIG. 7 shows a flowchart of a method for selecting a candidate range estimate from a plurality of candidate range estimates to determine the range to an object according to an embodiment of the present invention.
FIG. 8 shows a table comprising intermediate results.

The table in FIG. 8 shows, in the first column 530, the m-vectors for the seven range lines shown in FIG. 5b. The first range line 505 has the M vector (0,0), the second range line 506 has the M vector (0,1), the third range line 507 has the M vector (1,1), the fourth range line 508 has the M vector (1,2), the fifth range line 509 has the M vector (1,3), the sixth range line 510 has the M vector (2,3), and the seventh range line 511 has the M vector (2,4). FIG. 5c shows the range cells of the different phase differences, and the range lines 505-511.

Figure 6:
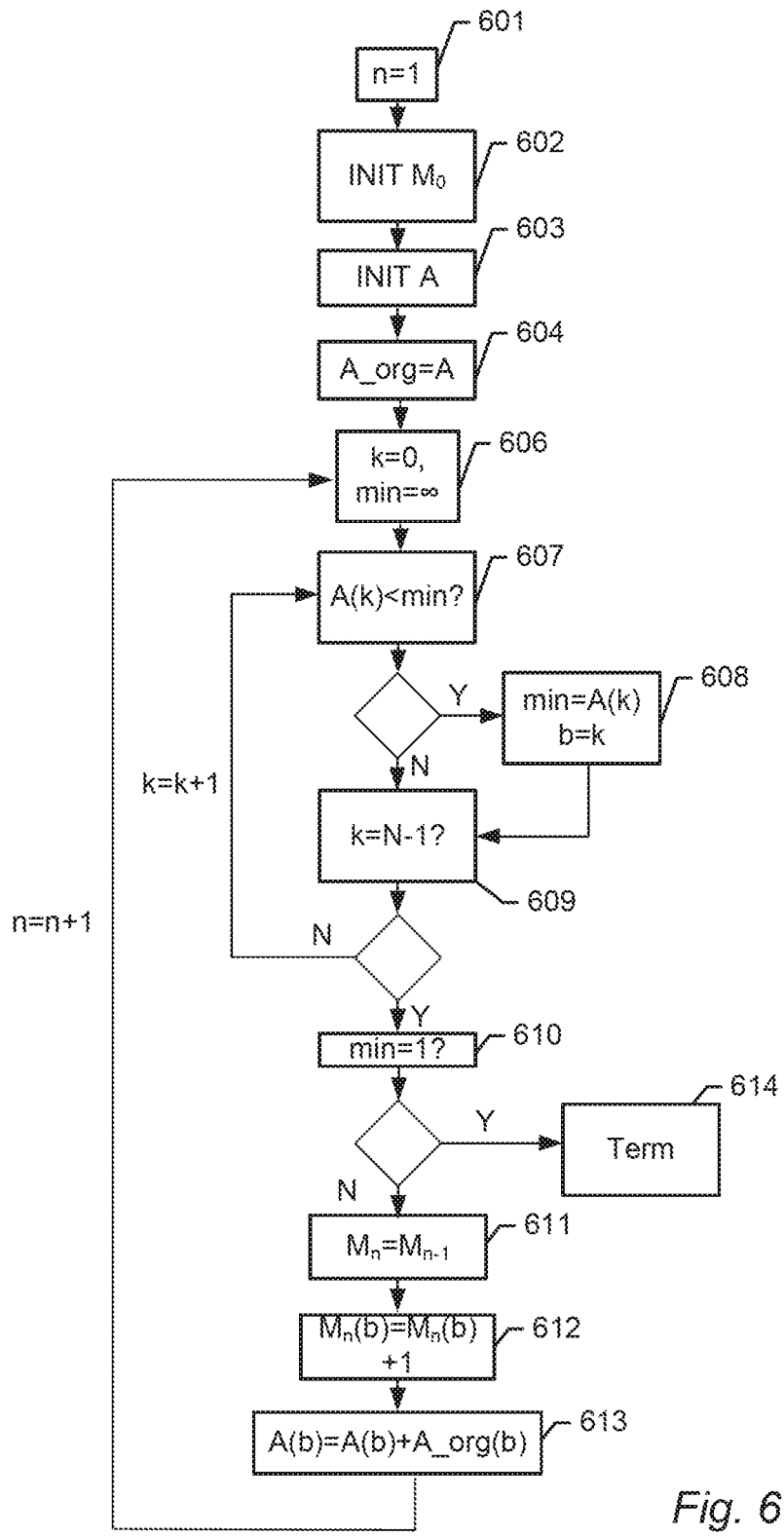
FIG. 6 shows a flowchart of a method for generating M vectors according to an embodiment of the present invention.

It should be noted that the method explained in relation to FIG. 6 needs only to run once pr. measurement setup. Thus if a method for estimating the range to an object according to the present invention is used in a Radar with a particular measurement setup e.g. a particular number of phase coordinates and a particular frequency difference ratio of the phase coordinates, the method explained in relation to FIG. 6 can be run by the manufacture, and the set of M vectors stored in a memory of the radar.

FIG. 7 shows a flowchart of a method for selecting a candidate range estimate from a plurality of candidate range estimates to determine the range to an object according to an embodiment of the present invention. The method selects a first set of the candidate range estimates, and for each candidate range estimate determines the distance from its unique associated point in the N-dimensional phase space to the measure point (MP); wherein the range to the object is estimated by selecting the candidate range estimate of the first set of candidate range estimates having an unique associated point in the N-dimensional phase space with the smallest distance to the measured point (MP).

First in step 701, the counter n is set to zero and the variable min is set to infinite. Next in step 702, for the n'th range line the candidate range $r_n$ on the n'th range line having the associated point positioned in the first N−1 dimensional hyper plane is found. This candidate range may be found using equation (4)

$$r_n/R = \frac{\sum_{i=1}^{N}(\varphi_i + M_n(i)) \cdot v_i}{\sum_{i=1}^{N} v_i^2} \tag{4}$$

where, R is unambiguous range for the chosen measurement setup, N is the number of phase coordinates, $\varphi_i$ is the i'th phase coordinate of the measure point (MP), $M_n$ is the M vector for the n'th range line and $v_i$ specify the number of range cells for the i'th phase difference in the chosen measurement setup, given by the frequency difference ratio between the used the phase differences. Then in step 704 the associated point in phase space for $r_n/R$ is determined. This point may be determined using equation (5)

$$\varphi a_{i,n} = v_i \cdot (r_n/R) - M_n(i) \tag{5}$$

where $\varphi a_{i,n}$ is the i'th phase coordinate of the point. Then, in step 704 the distance between the measure point (MP) and the point on the n'th range line being closest to the measure point (MP) is determined. This distance may be determined using equation (3). Next, in step 705 the method examines whether the determined distance is smaller than the variable min. If the determined distance is smaller than the variable min, the method goes to step 706, where it sets min to be equal to the determined distance for the n'th range line, and saves the value of the candidate range for the n'th range line in the variable EST and continues to step 707. If the determined distance is not smaller than the variable min, the method skips step 706 and goes directly to step 707. In step 707 the method determines whether all range lines has been examined, this may be done by determining whether n+1 is equal to the number of M vectors. If the method determines that not all range lines has been examiner the method returns to step 702 and increments n by 1. If all range lines has been examined the method terminates in step 708, and the value of EST is returned as the estimated range to the object.

The method described in relation to FIG. 7 may be used in the example shown in FIG. 5a-c to determined a first set of candidate ranges 514-520, and for each candidate range in the first set of candidate ranges determining the distance from its unique associated point in the N-dimensional phase space to the measure point (MP) 512; wherein the range to the object is estimated by selecting the candidate range estimate of the first set of candidate range estimates having an unique associated point in the N-dimensional phase space with the smallest distance to the measured point (MP). The table in FIG. 8 in the second to fifth column 530-534 shows resulting intermediate calculations. The second column 531 shows the candidate range for each of the range line having an associated point being closest to the measure point (MP) i.e. the first set of candidate ranges, the third and fourth column 532 533 shows the phase coordinates of the associated points 514-520 of the first set of candidate ranges, and the fifth column 534 shows the distance from the associated points 514-520 of the first set of candidate ranges to the measured point (MP) 512.

It can be seen that the third range line 507 is the range line that is farthest away from the measure point (MB), and that the fourth range line 508 is the range line being closest. Consequently, the method returns 0.462R as the estimated range to the object.

Figure 9:
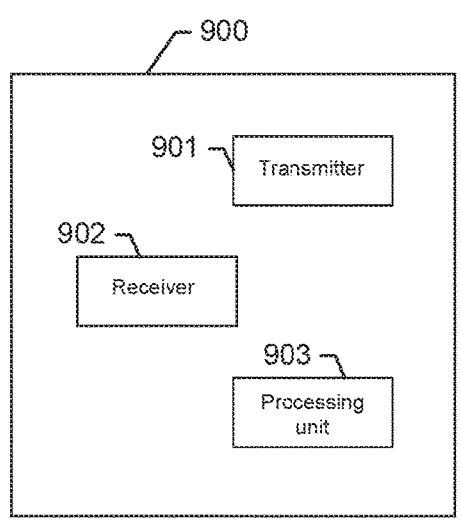
FIG. 9 shows a schematic drawing of a device for estimating the range to an object according to an embodiment of the present invention.

FIG. 9 shows a schematic drawing of a device 900 for estimating the range to an object according to an embodiment of the present invention. The device 900 comprises a transmitter 901, a receiver 902, and a processing unit 903. The transmitter 901 is configured to transmit a first signal towards the object, wherein the first signal comprises at least a primary frequency (F0), a first frequency (F1), and a second frequency (F2). The receiver 902 is configured to receive a reflected echo signal reflected from the object comprising at least the primary frequency (F0'), the first frequency (F1'), and the second frequency (F2'). The processing unit 903 is configured to determine a measured point (MP) in an N-dimensional phase space comprising at least a first phase coordinate representing the phase difference between the phase of the first frequency (F1') and the phase of the primary frequency (F0') in the received reflected echo signal, and a second phase coordinate representing the phase difference between the phase of the second frequency (F2') in the received reflected echo signal and the phase of a first reference frequency in a first reference signal wherein the first reference signal is a reflected echo signals reflected from the object. Additionally the processing unit 903 is configured to estimate the range to the object by selecting a candidate range estimate from a plurality of candidate range estimates, each candidate range estimate in the unambiguous range R having an unique associated point in the N-dimensional phase space positioned on range lines, and wherein a candidate range estimate is selected dependent on the distance from its unique associated point in the N-dimensional phase space to the measured point (MP), so that a single range estimate is generated using information from at least two measured phase differences without directly averaging ambiguous range estimates.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for estimating the range to an object using transmission of a multi frequency signal comprising the steps of:
   transmitting a first signal towards the object, wherein the first signal comprises at least a primary frequency (F0), a first frequency (F1), and a second frequency (F2);
   receiving a reflected echo signal reflected from the object comprising at least the primary frequency (F0'), the first frequency (F1'), and the second frequency (F2');
   determining a measured point (MP) in an N-dimensional phase space comprising at least a first phase coordinate representing the phase difference between the phase of the first frequency (F1') and the phase of the primary frequency (F0') in the received reflected echo signal, and a second phase coordinate representing the phase difference between the phase of the second frequency (F2') in the received reflected echo signal and the phase of a first reference frequency in a first reference signal wherein the first reference signal is a reflected echo signal reflected from the object;
   wherein the range to the object is estimated by selecting a candidate range estimate from a plurality of candidate range estimates, each candidate range estimate in the unambiguous range R having an unique associated point in the N-dimensional phase space positioned on a range line, and wherein a candidate range estimate is selected dependent on the distance from its unique associated point in the N-dimensional phase space to the measured point (MP), so that a single range estimate is generated using information from at least two measured phase differences without directly averaging ambiguous range estimates.

2. A method according to claim 1, wherein the first reference signal is the received reflected echo signal, and the first reference frequency in the first reference signal is the primary frequency (F0').

3. A method according to claim 1, wherein the first signal further comprises a third frequency (F3), and the measured point in the N-dimensional phase space further comprises a third phase coordinate representing the phase difference between the phase of the third frequency (F3) in the received reflected echo signal and the phase of a second reference frequency in a second reference signal so that a single range estimate is generated using information from at least three measured phase differences without first directly averaging ambiguous range estimates.

4. A method according to claim 3, wherein the second reference signal is the received reflected echo signal, and the second reference frequency is the primary frequency (F0').

5. A method according to claim 1, wherein the selected candidate range estimate is the candidate range estimate having an associated point in the N-dimensional phase space with the lowest distance to the measured point (MP).

6. A method according to claim 1, wherein a candidate range estimate is selected by selecting a first set of the candidate range estimates, and for each candidate range estimate in the first set of candidate range estimates determining the distance from its unique associated point in the N-dimensional phase space to the measure point (MP); wherein the range to the object is estimated by selecting the candidate range estimate of the first set of candidate range estimates having an unique associated point in the N-dimensional phase space with the smallest distance to the measured point (MP).

7. A method according to claim 6, wherein the unique associated points in the N-dimensional phase space of the candidate range estimates in the first set of candidate range estimates are positioned in a first N−1 dimensional hyper plane, wherein the first N−1 dimensional hyper plane is positioned so that the measured point (MP) in the N-dimensional phase space is positioned in the first N−1 dimensional hyper plane, and wherein the first N−1 dimensional hyper plane is oriented so that it is perpendicular to the range lines.

8. A method according to claim 7, wherein the first set of candidate range estimates is selected by examining a plurality of range lines, and for each of the plurality of range lines determining the candidate range having an associated point on the range line that have the lowest distance to the measured point (MP) in the N-dimensional phase space.

9. A method according to claim 6, wherein the method further comprises the steps of:
generating an alternative measured point (AMP) in the N-dimensional phase space if at least one of the phase coordinates of the measured point (MP) in the N-dimensional phase space is within a predetermined range;
determining for each candidate range estimate in the first set of candidate range estimates the distance from its associated point in N-dimensional phase space to the alternative measured point (AMP);
wherein the range to the object is estimated by selecting the candidate range estimate having the lowest minimum distance, wherein the minimum distance for a candidate range estimate is defined as the distance from its associated point in N-dimensional phase space to the measured point (MP) in N-dimensional phase space or the alternative measure point (AMP) in N-dimensional phase space whichever is lower.

10. A method according to claim 1, wherein the first set of candidate range estimates is selected from a plurality of sets of candidate range estimates dependent on the position of the measure point (MP) in N-dimensional phase space.

11. A device for estimating the range to an object using transmission of a multi frequency signal; wherein the device comprises:
a transmitter configured to transmit a first signal towards the object, wherein the first signal comprises at least a primary frequency (F0), a first frequency (F1), and a second frequency (F2);
a receiver configured to receive a reflected echo signal reflected from the object comprising at least the primary frequency (F0'), the first frequency (F1'), and the second frequency (F2'); and
a processing unit configured to determining a measured point (MP) in an N-dimensional phase space comprising at least a first phase coordinate representing the phase difference between the phase of the first frequency (F1') and the phase of the primary frequency (F0') in the received reflected echo signal, and a second phase coordinate representing the phase difference between the phase of the second frequency (F2') in the received reflected echo signal and the phase of a first reference frequency in a first reference signal wherein the first reference signal is a reflected echo signal reflected from the object;
wherein the processing unit further is configured to estimate the range to the object by selecting a candidate range estimate from a plurality of candidate range estimates, each candidate range estimate in the unambiguous range R having an unique associated point in the N-dimensional phase space positioned on range lines, and wherein a candidate range estimate is selected dependent on the distance from its unique associated point in the N-dimensional phase space to the measured point (MP), so that a single range estimate is generated using information from at least two measured phase differences without directly averaging ambiguous range estimates.

12. A device according to claim 11, wherein the second reference signal is the received reflected echo signal, and the reference frequency in the second reference signal is the primary frequency (F0').

13. A device according to claim 11, wherein the first signal further comprises a third frequency (F3), and wherein the measured point in the N-dimensional phase space further comprises a third phase coordinate representing the phase difference between the phase of the third frequency (F3) in the received reflected echo signal and the phase of a second reference frequency of a second reference signal so that a single range estimate is generated using information from at least three measured phase differences without first generating intermediate range estimates.

14. A device according to any of claim 13, wherein the second reference signal is the received reflected echo signal, and the reference frequency in the third reference signal is the primary frequency (F0').

15. A device according to claim 11, wherein the processing unit is configured to select the candidate range estimate having an associated point in the N-dimensional phase space with the lowest distance to the measured point (MP).

16. A device according to claim 11, wherein the processing unit is configured to select a candidate range estimate by selecting a first set of the candidate range estimates, and for each candidate range estimate in the first set of candidate range estimates determining the distance from its unique associated point in the N-dimensional phase space to the measure point (MP); and estimate the range to the object by selecting the candidate range estimate of the first set of candidate range estimates having an unique associated point in the N-dimensional phase space with the smallest distance to the measured point (MP).

17. A device according to claim 16, wherein the unique associated points in the N-dimensional phase space of the candidate range estimates in the first set of candidate range estimates are positioned in a first N−1 dimensional hyper plane in the N-dimensional phase space, wherein the first N−1 dimensional hyper plane is positioned so that the measured point (MP) is positioned in the first N−1 dimensional hyper plane, and wherein the first N−1 dimensional hyper plane is oriented so that it is perpendicular to the range lines.

18. A device according to claim 17, wherein the processing unit is configured to select the first set of candidate range estimates by examining a plurality of range lines, and for each of the plurality of range lines determining the candidate range having an associated point on the range line that have the lowest distance to the measured point (MP) in the N-dimensional phase space.

19. A device according to claim 16, wherein the processing unit is configured to select the first set of candidate range estimates from a plurality of sets of candidate range estimates dependent on the position of the measure point (MP) in the N-dimensional phase space.

20. A device according to claim 16, wherein the processing unit further is configured to:

generate an alternative measured point (AMP) in the N-dimensional phase space if at least one of the phase coordinates of the measured point (MP) in the N-dimensional phase space is within a predetermined range; and determining for each candidate range estimate in the first set of candidate range estimates the distance from its associated point in the N-dimensional phase space to the alternative measured point (AMP);

wherein the range to the object is estimated by selecting the candidate range estimate having the lowest minimum distance, wherein the minimum distance for a candidate range estimate is defined as the distances from its associated point in the N-dimensional phase space to the measured point (MP) or the alternative measure point (AMP) whichever is the lowest.

* * * * *